Sept. 9, 1958 W. L. POLLARD 2,850,918
FLUID TORQUE CONVERTER GEAR TRANSMISSION
Filed March 15, 1954 3 Sheets-Sheet 1
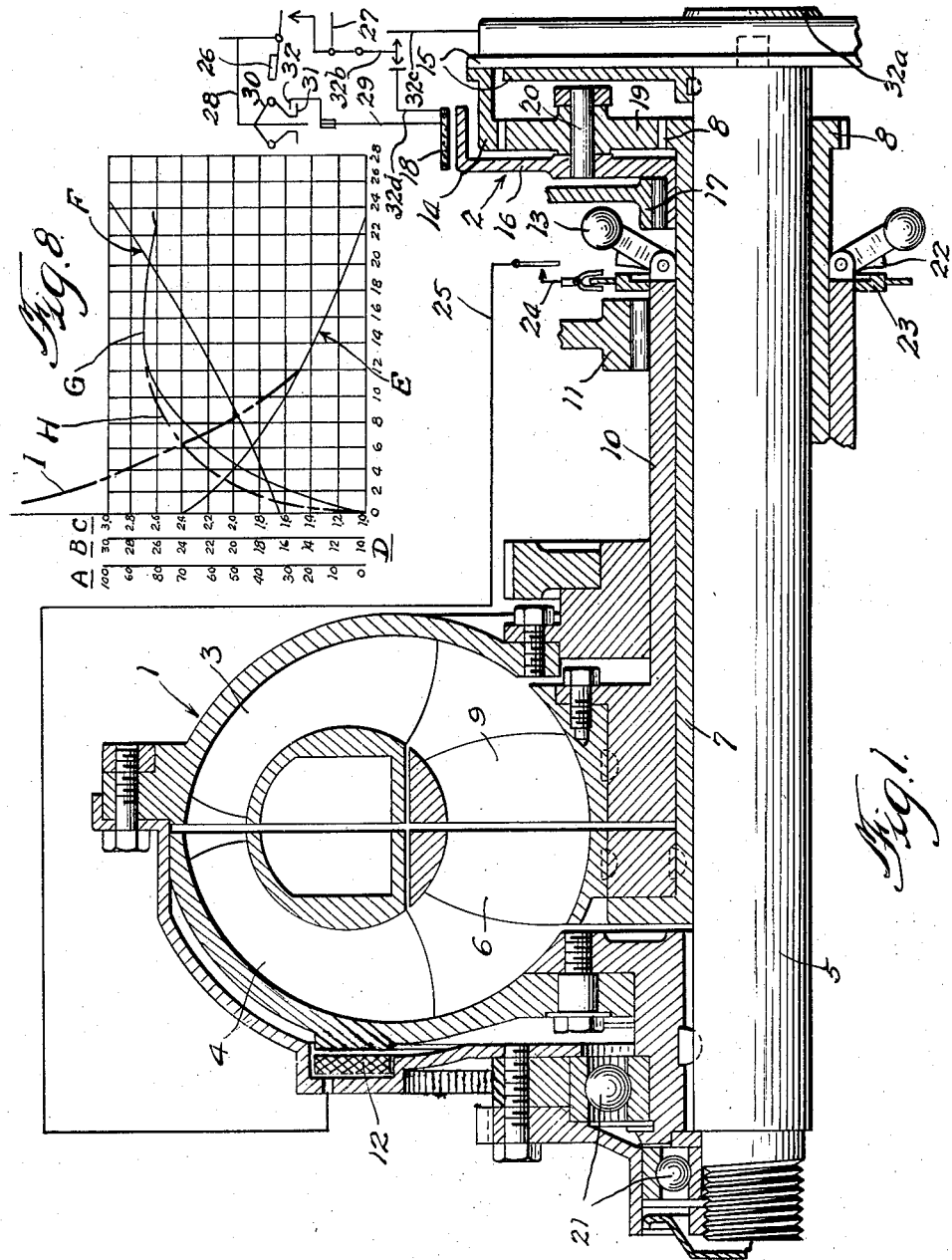
INVENTOR.
Willard L. Pollard
BY
Thiess, Olson & Mecklenburger
Attys

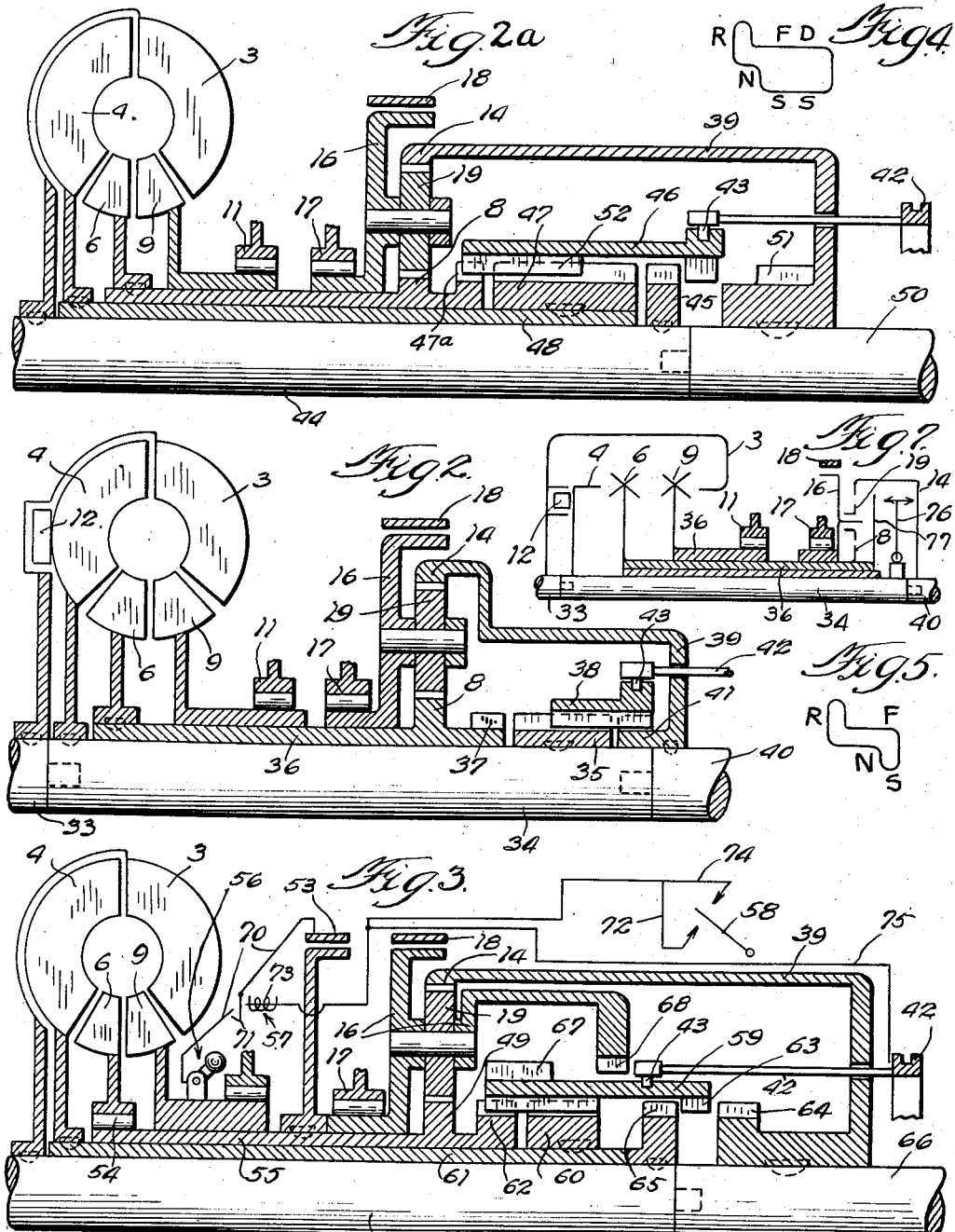

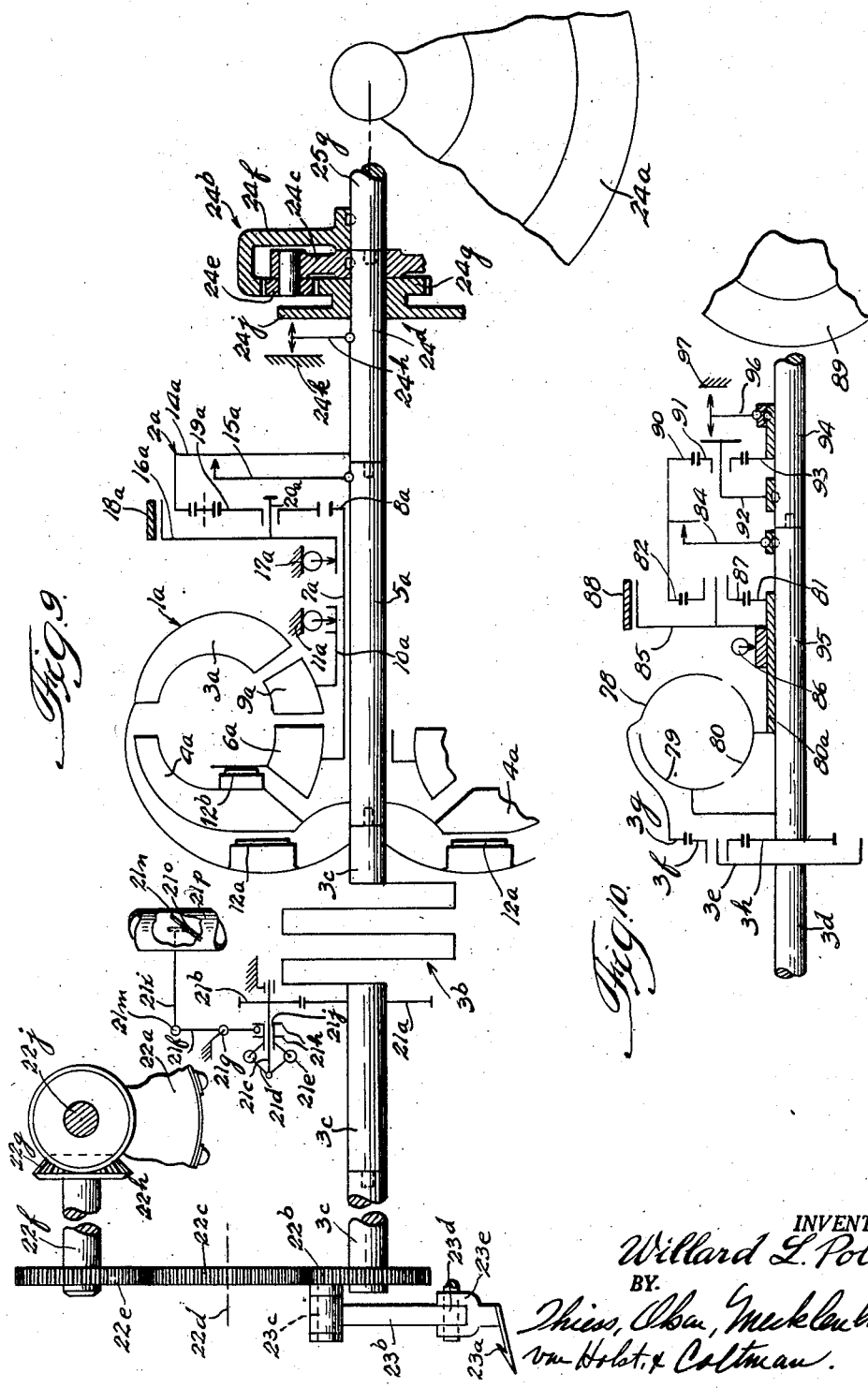

United States Patent Office 2,850,918
Patented Sept. 9, 1958

2,850,918

FLUID TORQUE CONVERTER GEAR TRANSMISSION

Willard L. Pollard, Evanston, Ill.

Application March 15, 1954, Serial No. 416,369

3 Claims. (Cl. 74—645)

This application is a continuation-in-part of my copending application Serial No. 344,703, filed March 26, 1953, which is a continuation of my previous application Serial No. 140,615, filed January 26, 1950.

My invention relates to fluid torque converter gear transmissions.

One of the objects of my invention is to provide an improved transmission of this type which will give an extremely high starting torque with an infinitesimally variable speed ratio from this high starting torque up to fluid coupling, without any jerk.

A further object of my invention is to provide such a transmission which will greatly improve a considerable extent of the lower portion of the efficiency and torque curves of the transmission.

A further object of my invention is to provide such a transmission in which the hydraulic torque converter may be of a conventional type and in which the clutch and brake and planetary constructions may be of conventional types.

A further object of my invention is to provide such a transmission which will be relatively inexpensive to manufacture and simple to control.

A further object of my invention is to provide such a transmission which will automatically cause an increased engine-braking retarding action in coasting downhill or in coming to a quick stop for a stop signal.

A further object of my invention is to provide an improved combination of combine and torque converter in which the internal combustion engine and the cylinder of the combine will be driven at substantially constant synchronous speed and the vehicle will be driven at an automatically infinitesimally variable speed and with an automatically infinitesimally variable torque from the constant speed engine by means of a hydraulic torque converter.

Further objects and advantages of my invention will be apparent from the description and claims.

In the drawings, in which several forms of my invention are shown,

Fig. 1 is an axial vertical cross section of a transmission embodying my invention;

Fig. 2 is a vertical axial cross section showing another form of transmission;

Fig. 2ª is a vertical axial cross section showing another form of transmission;

Fig. 3 is a vertical axial cross section showing another form of transmission;

Fig. 4 is a diagrammatic view indicating the various positions which a controller may take in controlling the transmission of Fig. 2ª;

Fig. 5 is a diagrammatic view showing the various positions which a controller may take in controlling the transmission of Fig. 2;

Fig. 6 is a diagrammatic view showing various positions which a controller may take in controlling the transmission of Fig. 3;

Fig. 7 is a vertical axial cross section showing diagrammatically another form of transmission;

Fig. 8 is a chart showing various curves;

Fig. 9 is a diagrammatic view of an improved combination of a combine and torque converter in which the internal combustion engine and the cylinder of the combine will be driven at an automatically infinitesimally variable speed and with an automatically infinitesimally variable torque from the constant speed engine by means of a hydraulic torque converter, and Fig. 10 is a diagrammatic view showing another form.

Referring first to Fig. 1, the construction shown therein comprises a hydraulic torque converter 1, a planetary transmission 2 and associated parts. The hydraulic torque converter comprises a pump rotor 3 which may be driven direct from the motor, a turbine rotor 4 secured to a central drive shaft 5, a primary reaction rotor 6 keyed to a tubular shaft 7 surrounding the central shaft 5 and provided with a sun gear 8 rotatable therewith, and a secondary reaction stator rotor 9 secured to a tubular shaft 10 surrounding the tubular shaft 7 and held against rotation reverse to the pump rotor by means of a one-way anchorage device 11. The primary reaction rotor 6 acts as a driving turbine rotor rotatable initially in a direction reverse to that of the pump rotor 3. A clutch 12 is provided which may be used for connecting the turbine rotor 4 to the pump rotor 3 to eliminate the torque converter action for direct drive. The action of this clutch may be controlled by a centrifugal force governor 13 rotatable with and controlled by the speed of the shaft 10 secured to the secondary stator rotor 9.

The planetary gearing comprises the sun gear 8, a ring gear 14 connectible and disconnectible with respect to the turbine shaft 5 by means of a manually controllable clutch 15, a gear carrier 16 held against rotation in the direction of the pump rotor 3 by means of a one-way anchorage device 17, and held against any rotation whatever by means of a manually controllable brake 18, and planet gears 19 rotatably mounted on the gear carrier on stub shafts 20 and meshing with the sun gear 8 and ring gear 14. Suitable anti-friction bearings 21 may be provided between the central shaft 5 and the pump rotor 3.

In use, assuming that the transmission is used in a motor vehicle and that the motor vehicle is standing still, the pump rotor 3 will cause forward rotation of the turbine rotor 4 and will exert a reverse rotational force on the primary and secondary reactance rotors 6 and 9. The reverse torque on the secondary rotor 9 which is held against reverse rotation by the one-way anchor 11 will cause a corresponding increase in the forward torque on the turbine 4. The reverse rotational torque exerted on the primary reaction rotor 6 will exert a corresponding reverse rotational force on the sun gear 8 which will cause a greatly increased forward rotational torque to be exerted on the ring gear 14, since the gear carrier 16 is held against rotation by the one-way anchorage device 17. It is assumed that in forward drive the ring gear which drives the propeller shaft is also connected with the turbine shaft 5 by means of the clutch 15. The combined torque on the propeller shaft will therefore be the torque exerted by the turbine rotor 4 plus the torque exerted on the ring gear 14 by the reverse rotation of the primary reactance rotor as described above. Typical curves such as might be secured by the torque converter shown with the primary reactance rotor held against reverse rotation by a one-way anchorage member, as compared with the construction actually shown in Fig. 1, are shown in Fig. 8. As there indicated, applicant's construction may give substantially twice the original starting torque with an infinitesimally variable speed ratio from its high starting torque up to fluid coupling, and results in a great improvement in the lower portion of the efficiency and torque curves.

For reverse drive, assuming that the vehicle is standing still, the clutch 15 is disconnected, thereby disconnecting the propeller shaft from the turbine shaft 5. In this condition the transmission will be in neutral, no force being exerted thereon because of the disconnection of the clutch 15. For reverse the brake 18 is applied by suitable manual controls. Under these conditions, since the pump and the three rotors 4, 6 and 9 are acting as a fluid coupling flywheel, the primary reaction rotor 6 will act as a fluid coupling member of the flywheel and will cause forward rotation thereof and of the sun gear rotatable therewith. This will cause reverse rotation of the ring gear, since the gear carrier is held against rotation.

In going down a steep hill, the accelerator pedal will usually be released and the vehicle will have to drive the motor rather than the motor driving the vehicle. Under these conditions, in order to prevent the vehicle from going too fast downhill, an additional retarding action is brought into play by making the transmission so that if a certain speed is exceeded and the accelerator pedal is released, the brake will be applied. This application of the brake 18 will cause the forward rotation of the ring gear 14 to cause a high speed reverse rotation of the sun gear 8 and a consequent high speed reverse rotation of the primary reaction rotor 6, resulting in an additional retarding action on the ring gear 14. This retarding action is due to the resistance to reverse rotation of the primary reaction rotor 6 caused by the liquid flow occasioned by the direct rotation of the rotors 3, 4 and 9. For controlling the action of the direct drive clutch 12, a centrifugal force flyball governor 13 is provided which comes into effect when the forces acting on the secondary reaction rotor 9 are such as to cause it to disconnect from the anchorage member 11 and rotate in the same direction as the pump rotor. This action takes place some time after the fluid part of the transmission is automatically transformed from a torque converter to a fluid coupler.

As the speed of the shaft 10 increases, the actuators 22 on the flyball governor will push the slide 23 to the left. This will actuate the rockable switch 24 to cause the energization of the line 25$^a$ leading to the controller 25$^b$ for the clutch 12. This will connect the turbine rotor 4 to rotate directly with the pump rotor 3.

For controlling the brake 18 to effect a retarding action when the vehicle is driving the motor, the accelerator pedal 26 is so designed that when the foot is removed from this accelerator pedal, it will connect the power supply 27 with a line 28 leading to the control line 29 for the brake 18.

If desired, a speed control device may be provided in series with the accelerator pedal control so that the brake will not be applied to effect a retarding action unless the vehicle speed is up to a predetermined amount. This speed controlled connection comprises a flyball governor 30 controlled by vehicle speed which when the speed reaches a certain amount, will bring the contact 31 into engagement with the contact 32, thus connecting the lines 28 and 29. If the vehicle speed is up to the predetermined degree, the acceleration pedal when released will cause an additional retarding effect. If the speed is below the predetermined speed, the accelerator pedal will not be effective to cause retardation.

If desired, a conventional overdrive may be provided at 32$^a$ between the driven member of the clutch and the propeller shaft. Such a conventional overdrive is shown in a book entitled "Torque Converters," copyright 1942, by P. M. Heldt, pages 216–219, inclusive.

For manually controlling the establishment of forward, neutral, and reverse conditions, a manually controlled three-position lever 32$^b$ is provided which in rear position engages the conductor 32$^c$ to connect the clutch 15 for forward drive, in forward position engages the conductor 32$^d$ to release the clutch 15 and apply the brake 18 for reverse drive, and in intermediate position disconnects both the clutch 15 and the brake 18 for neutral.

Referring to Fig. 2, in this construction the torque converter, including the pump rotor 3, the turbine rotor 4, and the two reactance rotors 6 and 9, the clutch 12 for connecting the turbine rotor 4 to the pump rotor 3, the planetary gearing, including the sun gear 8, the ring gear 14, the gear carrier 16, the planet gears 19, the one-way anchor 11 co-acting with the reactance rotor 9, the one-way anchor 17 co-acting with the gear carrier 16, and the brake 18 co-acting with the gear carrier 16, are substantially the same as in Fig. 1. A dog clutch construction which may be a synchronous clutch construction is substituted for the clutch construction shown in Fig. 1.

The pump rotor 3 is keyed to the drive shaft 33 which may be driven from the motor. The turbine rotor 4 is keyed to an intermediate shaft 34 to which is keyed one of the dog clutch members 35. The reactance rotor 6 is keyed to a tubular shaft 36 with which the sun gear 8 rotates, which shaft is provided with a dog clutch member 37 co-operating with the shiftable dog clutch member 38 and which is splined on the dog clutch member 35. The ring gear 14 has a rearward extension 39 which is keyed to the propeller shaft 40. The rearward extension 39 is provided with a dog clutch construction 41 co-operating with the shiftable dog clutch member 38. The shiftable dog clutch member is operated by means of a yoke having arms 42 extending through openings in the rearward extension 39 of the ring gear provided with inwardly-extending pins 43 engageable in an annular groove in the shiftable dog clutch member 38. Any suitable means may be provided for controlling the clutch 12 acting between the pump rotor and turbine rotor, for example, such as shown in Fig. 1.

The shiftable dog clutch member 38 has three positions, one for forward, one for neutral, and one for reverse. For forward drive, the dog clutch member is placed in the position shown in Fig. 2 in which it connects the dog clutch member 35 on the turbine shaft with the ring gear 14. For forward drive, the brake 18 will be in off-position. The operation for forward drive will be substantially as described in connection with Fig. 1. The turbine 4 will exert torque on the propeller shaft 40 through the clutch 38. The reactance rotor 6 will at first rotate in reverse, and through the sun gear 37 and planet gears 19 will exert a forward rotational effort on the ring gear 14 and propeller shaft 40 which will be added to the forward rotational force exerted by the turbine rotor 4. As the relation of motor speed and torque to propeller shaft speed and torque changes, the propeller shaft 40 will pick up in speed, the reactance on the reactance rotor 6 will decrease and become zero and the reactance rotor 6 will begin to rotate in a forward direction, at which time it will cease to exert force on the planet gears, as the gear carrier 16 will then move away from the one-way anchor 17. The hydraulic torque converter, however, will still continue to function as a torque converter due to the reactance on the other reactance rotor 9 until the reactance on this reactance rotor 9 also becomes zero, at which time the hydraulic converter will be transformed into a hydraulic coupler.

For neutral, the slidable dog clutch member is shifted forwardly to a position in which it is not in engagement either with the ring gear clutch 41 or with the dog clutch 37 which is rotatable with the sun gear 8.

For reverse drive, the slidable dog clutch member 38 is shifted to engage it with the dog clutch member 37 rotatable with the sun gear 8, and the brake 18 is applied to hold the gear carrier 16 against rotation. In this condition, the slidable dog clutch member 38 will be disconnected from the ring gear clutch 41. The turbine rotor 4, reactance rotor 6, and sun gear 8 will rotate as a unit in a forward direction. As the gear carrier 16 is held against rotation by the brake 18, the ring gear 14 and propeller shaft 40 will be rotated in reverse.

The retarding action of the brake 18 for slowing up for steep downgrades or on approaching a stop light may be controlled as disclosed in connection with Fig. 1.

The construction shown in Fig. 2$^a$ is similar to that shown in Fig. 2. The pump rotor 3, turbine rotor 4, reactance rotors 6 and 9, one-way anchors 11 and 17, sun gear 8, ring gear 14, gear carrier 16, planet gears 19, brake 18, and shifting yoke 42 are substantially the same as shown in Fig. 2. In Fig. 2ª the pump rotor 3 which may be driven from the engine is keyed to a shaft 44 which extends rearwardly and has secured to its rear end a dog clutch member 45 co-operating with the slidable dog clutch member 46, splined on the clutch member 47, which is keyed to the shaft 48 on which the turbine rotor 4 is keyed. This enables the turbine rotor 4 to be secured to rotate directly with the pump rotor when desired for direct drive.

In this form the slidable clutch member 46 may occupy four different positions; one for reverse, one for neutral, one for forward drive direct from the turbine, and one for forward drive direct from the pump.

For reverse drive the slidable dog clutch member 46 is placed in the forward position shown in the drawing in which the dog clutch member 47 on the tubular shaft connected with the turbine rotor 4 is connected with the dog clutch formation 47ª which is rotatable with the sun gear 8. The brake 18 is applied and the sun gear 8, turbine 4, and reactance rotor 6 will rotate forwardly, causing reverse rotation of the ring gear 14 and consequent reverse rotation of the propeller shaft 50 keyed to the ring gear.

For neutral, the slidable dog clutch member 46 is shifted one step rearwardly. In this position the dog clutches are all disconnected and the turbine rotor 4 can rotate freely without exerting force on either the sun gear 8 or the ring gear 14.

For forward turbine drive, the slidable dog clutch member 46 is shifted another step rearwardly. In this position the slidable dog clutch member connects the dog clutch member 47 on the turbine shaft 48 with the ring gear clutch 51.

For drive direct from the pump rotor, the slidable dog clutch member 46 is shifted to its rearmost position in which the clutch formation 52 on the slidable dog clutch member will engage the dog clutch member 45 on the pump shaft 44.

In the construction of Fig. 2ª, a retarder action may be effected by applying the brake 18 as described in connection with Figs. 1 and 2.

In the construction shown in Fig. 3, the pump rotor 3, the turbine rotor 4, the reactance rotors 6 and 9, the one-way anchor 17, the gear carrier 16, the ring gear 14, the sun gear 49, and the rearward extension 39 may be substantially the same as shown in Fig. 2ª. In Fig. 3, structure is shown which enables an overdrive to be obtained. This is accomplished by means of a clutch construction which enables the turbine rotor 4 to be disconnected from the ring gear 14 and connected with the gear carrier 16 and by means of a brake 53, which may be applied to hold the sun gear 49 against rotation. A one-way clutch 54 is provided between the reactance rotor 6 and the tubular sun gear shaft 55 which will enable the reactance rotor 6 to drive the sun gear 49 when the reactance rotor 6 is rotating reversely with respect to the pump rotor 3, but will enable the reactance rotor 6 to overrun the sun gear shaft 55 when the reactance rotor 6 is rotating in the same direction as the pump rotor 3 and the sun gear 49 is held against rotation by the brake 53.

Reactance rotor speed controlled means 56 are provided for applying the brake 53 to hold the sun gear 49 against rotation to effect overdrive when the vehicle speed reaches a certain degree and for rendering this speed control means ineffective when the clutch construction 59 is set for reverse. Means 57 are also provided, controlled by the accelerator pedal 58, for releasing the brake 53 if it is applied for overdrive, by depressing the accelerator pedal 58 beyond its normal depressed position and for releasing the sun gear 49 to cut out the overdrive if the pedal accelerator is released and the pedal 58 rises to its extreme upper position. As explained hereinafter, release of the brake 53 and gear 49 will cut out the overdrive, thus enabling the motor to run at high speed and the propeller shaft at low speed and high torque.

The clutch construction comprises a dog clutch member 59 splined to the clutch member 60 on the turbine shaft 61 and having three positions, one for reverse, one for forward with fluid drive, and one for direct and for overdrive.

In the reverse drive position the slidable clutch member is in its forward position in which the slidable clutch member 59 connects the turbine dog clutch member 60 with the sun gear clutch member 62, and the dog clutch member 63 is out of engagement with respect both to the ring gear dog clutch 64 and the pump shaft dog clutch 65. With this position of the dog clutch, when the brake 18 is applied and the turbine rotor 4 is in action, it will cause forward rotation of the sun gear 49 and reactance rotor 6. This will cause reverse rotation of the ring gear 14 since the gear carrier 16 is held against rotation. This will cause reverse rotation of the propeller shaft 66, which is keyed to the rearward extension 39 of the ring gear 14. For forward fluid drive the slidable clutch member 59 is shifted one step rearwardly, disconnecting the sun gear 49 from the turbine clutch 60 and connecting the slidable clutch member 63 with the dog clutch 64 on the ring gear extension 39. Thus the ring gear 14 is constrained to rotate with the turbine rotor 4 for forward fluid drive.

For direct drive the slidable clutch member 59 is shifted another step rearwardly. This connects the clutch formation 67 of the sliding clutch member with the dog clutch formation 68 on the rear extension of the gear carrier 16 and disconnects the slidable clutch member 63 from the ring gear clutch 64. It also connects the dog clutch member 60 on the turbine sleeve 61 with the dog clutch member 65 on the shaft 59 on which the pump rotor 3 is keyed. This connects the gear carrier 16 to rotate directly with the pump rotor 3. The sun gear 49 is held against overrunning the pump rotor 3 and turbine rotor 4 to any great degree by reason of the one-way clutch connection 54 between the sun gear 49 and the reactance rotor 6. With the clutch in this position, overdrive may be obtained by applying the brake 53 which will hold the sun gear 49 against rotation, causing an overdrive of the ring gear 14 and propeller shaft 66 keyed thereto.

The automatic control for the application of the brake 53 for controlling overdrive comprises a centrifugal speed governor 56 substantially like that shown in Fig. 1 which, when the rotor 9 reaches a predetermined speed, will energize the conductor 70 and a suitable solenoid to cause the brake 53 to be applied. The circuit for this conductor 70 may be broken by means of a switch 71 to release the brake 53 and cut out the overdrive. This switch may be controlled by means of the accelerator pedal 58. If the vehicle is in overdrive and is being driven up a steep hill and it is desired for any reason to secure a burst of speed, the accelerator pedal 58 is pressed down beyond its normal position. This will energize a circuit 72 leading to a solenoid 73 for the switch 71 and will release the brake 53 and cut out the overdrive, thus enabling the motor to run at extreme high speed and with high torque. Means are also provided whereby if the vehicle is in overdrive and a steep downgrade is encountered, release of the accelerator pedal 58 will automatically cut out the overdrive. This is accomplished by a circuit 74 which is energized when the accelerator pedal is released to open the switch 71 and release the brake. Means are provided for preventing the application of this brake 53 when the dog clutch mechanism is set for reverse, comprising a circuit 75 which is energized by grounding when the clutch actuating yoke 42 is in its front position for reverse drive to open the switch 71 and release the brake 53.

Figs. 4, 5, and 6 indicate diagrammatically the positions which a manual control lever may occupy for the various drive conditions corresponding to Figs. 2, 2ª, and 3, respectively. In these figures the letters R, N, F, D, and S correspond, respectively, to reverse, neutral, forward fluid drive, direct drive, and slow-down.

The construction shown in Fig. 7 is substantially like that shown in Fig. 2 except that a two-way friction clutch is substituted for the two-way dog clutch of Fig. 2. The pump rotor 3, the turbine rotor 4, the reactance rotors 6 and 9, the clutch 12, the one-way anchors 11 and 17, the brake 18, the gear carrier 16 the planet gears 19, the ring gear 14, the sun gear 8, the shafts 36, 33, 34, and 40 may be the same as those shown in Fig. 2.

In place of the dog clutch control of Fig. 2, a two-way friction clutch 76 is provided which, in one position, connects the ring gear 14 with the turbine shaft 34 and, in another position, connects the sun gear 8 with the turbine shaft 34.

The operation is the same as that in Fig. 2. When the clutch 76 is connecting the ring gear 14 with the shaft 34 and the brake 18 is released, the transmission is in forward fluid drive. Direct drive would be obtained by applying the clutch 4 to connect the turbine shaft 34 direct with the pump rotor 3. For neutral, the two-way clutch 76 is operated to connect with the friction plate 77 which is fixed to the sun gear shaft 36. Under these conditions the turbine rotor 4, the reactance rotor 6, and probably the reactance rotor 9 will rotate freely along with the pump rotor 3, but no torque will be exerted on the ring gear 14 as the gear carrier 16 is free to rotate in a forward direction. For reverse, the brake 18 is applied, whereupon reverse torque will be exerted immediately on the ring gear 14 to cause it to rotate in a direction reverse to that of the pump rotor 3, since the friction plate 77 is fixed to the sun gear shaft 39 so that the sun gear will rotate with the clutch 76 and turbine rotor 4.

In Fig. 8, which shows comparative speed, torque, and efficiency curves, the first vertical column of figures A indicates the efficiency in percentage. The second vertical column of figures B indicates the engine R. P. M. in hundreds. The third vertical column of figures C indicates torque ratio with respect to engine torque. The horizontal row of figures D at the bottom indicates turbine R. P. M. in hundreds. The full-line curve E indicates torque multiplication plotted against turbine speed. The full-line curve F indicates engine R. P. M. The full-line curve G indicates efficiency plotted against turbine R. P. M. The above curves E, F, and G are the curves obtained without the use of the planetary booster including the gearing 8, 14, 16 and 19, the clutch 15, the one-way anchorage device 17 and the brake 18 and with a one-way anchorage for the primary reactance rotor 6 which may be similar to the one-way anchorage 11 used for the secondary reactance rotor 9. The dot-dash lines H and I indicate the improvement in efficiency and torque obtained by the use of the planetary torque booster. These curves materially increase the pickup and efficiency of the transmission and give a jerkless infinitesimally variable torque curve from stalling to coupling.

The points of intersection of the dot-dash curves H and I with the full-line curves G and E indicate the turbine speed at which the primary reactance rotor will have ceased to rotate reversely and have come to a standstill. From this point on the efficiency and torque curves will be the same as if the primary reactance rotor had been provided with a one-way reactance member. Prior to this point the primary reactance rotor 6, in rotating reversely, will have caused a reverse reactance on the secondary reactance rotor 9 which, in turn, would cause an increase in torque on the turbine rotor 4.

Referring to Fig. 9, the construction shown therein comprises an improved combination of combine and torque converter in which the internal combustion engine and the cylinder of the combine will be driven at substantially constant synchronous speed and the tractor of the combine will be driven at an automatically infinitesimally variable speed and with an automatically infinitesimally variable torque from the constant speed engine by means of a hydraulic torque converter.

In tractor-propelled combines, it may be desirable to maintain the engine speed substantially constant and to drive the threshing cylinder and perhaps the sickle also in synchronism with the engine and to provide an automatically infinitesimally variable speed hydraulic torque converter driven from the engine and driving the drive wheels of the tractor. In combines, in general, it is desirable to maintain the speed of the cylinder substantially constant in order to do satisfactory work. It is, however, desirable to provide automatically variable speed and torque ratio between the engine and the drive wheels of the tractor to take care of the wide variations in load on the engine due to variations in the gradient, condition of the roadway, crop yield, etc.

The hydraulic torque converter 1ª is in general similar to the torque converter 1 shown in Fig. 1. It is combined with a planetary transmission 2ª and associated parts. The hydraulic torque converter comprises a pump rotor 3ª, which may be driven direct from the internal combustion engine 3ᵇ, a turbine rotor 4ª secured to a drive shaft 5ª, a primary reaction rotor 6a secured to a shaft 7ª, and provided with a sun gear 8ª rotatable therewith, and a secondary reaction stator 9ª secured to a shaft 10ª coaxial with the shaft 7ª and held against rotation reverse to the pump rotor 3ª by means of a one-way anchorage device 11ª. A clutch 12ª is provided which may be used for connecting the turbine rotor 4ª to the pump rotor 3ª to eliminate the torque converter action for direct drive. A clutch 12ᵇ is provided which may be used for connecting the reaction rotor 6ª to the turbine rotor 4ª.

The planetary gearing comprises the sun gear 8ª, a ring gear 14ª connectible and disconnectible with respect to the turbine shaft 5ª by means of a manually controllable clutch 15ª, the gear carrier 16ª held against reverse rotation in the direction of the pump rotor 3ª by means of a one-way anchorage device 17ª and held against any rotation whatever by means of a manually controllable brake 18ª, and planet gears 19ª rotatably mounted on the gear carrier 16ª on shafts 20ª and meshing with the sun gear 8ª and ring gear 14ª.

In use, assuming that the transmission is used in a motor vehicle and that the motor vehicle is standing still, the pump rotor 3ª will cause forward rotation of the turbine rotor 4ª and will exert a reverse rotational force on the primary and secondary reactance rotors 6ª and 9ª. The reverse torque on the secondary rotor 9ª which is held against reverse rotation by the one-way anchor 11ª will cause a corresponding increase in the forward torque on the turbine 4ª. The reverse rotational torque exerted on the primary reaction rotor 6ª will exert a corresponding reverse rotational force on the sun gear 8ª which will cause a greatly increased forward rotational torque to be exerted on the ring gear 14ª, since the gear carrier 16ª is held against rotation by the one-way anchorage device 17ª. It is assumed that in forward drive the ring gear which drives the propeller shaft is also connected with the turbine shaft 5ª by means of the clutch 15ª. The combined torque on the propeller shaft will therefore be the torque exerted by the turbine rotor 4ª plus the torque exerted on the ring gear 14ª by the reverse rotation of the primary reactance rotor as described above. Typical curves such as might be secured by the torque converter shown with the primary reactance rotor held against reverse rotation by a one-way anchorage member, as compared with the construction actually shown in Fig. 1, are shown in Fig. 8. As there indicated, applicant's construction may give substantially twice the original starting torque with an infinitesimally variable speed ratio from its high starting torque up to fluid coupling, said results in a great improvement in the lower portion of the efficiency and torque curves.

For reverse drive, assuming that the vehicle is standing still, the clutch $15^a$ is disconnected, thereby disconnecting the propeller shaft from the turbine shaft $5^a$. In this condition the transmission will be in neutral, no force being exerted thereon because of the disconnection of the clutch $15^a$. For reverse the brake $18^a$ is applied by suitable manual controls. Under these conditions, since the pump and the three rotors $4^a$, $6^a$ and $9^a$ are acting as a fluid coupling flywheel, the primary reaction rotor $6^a$ will act as a fluid coupling member of the fly-wheel and will cause forward rotation thereof and of the sun gear rotatable therewith. This will cause reverse rotation of the ring gear, since the gear carrier is held against rotation.

In going down a steep hill, the accelerator pedal will usually be released and the vehicle wil have to drive the motor rather than the motor driving the vehicle. Under these conditions, in order to prevent the vehicle from going too fast downhill, an additional retarding action is brought into play by making the transmission so that if a certain speed is execeeded and the accelerator pedal is released, the brake will be applied. This application of the brake $18^a$ will cause the forward rotation of the ring gear $14^a$ to cause a high speed reverse rotation of the sun gear $8^a$ and a consequent high speed reverse rotation of the primary reaction rotor $6^a$, resulting in an additional retarding action on the ring gear $14^a$. This retarding action is due to the resistance to reverse rotation of the primary reaction rotor $6^a$ caused by the liquid flow occasioned by the direct rotation of the rotors $3^a$, $4^a$ and $9^a$.

The engine $3^b$ for driving the pump rotor $3^a$ comprises the crankshaft $3^c$ with which the pump rotor $1^a$ is rotatable.

The apparatus by which the internal combustion engine $3^b$ will be driven at substantially constant speed regardless of the load on the engine comprises a gear $21^a$ rotatable with the crankshaft $3^c$ and coaxial therewith, a gear $21^b$ driven from the gear $21^a$, a governor shaft $21^c$ coaxial with the gear $21^b$, a flyball governor $21^d$ coaxial with the governor shaft and having a sleeve surrounding the shaft $21^c$ and reciprocable back and forth in accordance with the position of the balls $21^e$ of the flyball governor, a lever $21^f$ pivotally mounted at $21^g$ and having one end lying between the flanges $21^h$ of the sleeve $21^j$ and rockable back and forth about the pivot $21^g$, a link $21^i$ pivotally connected at $21^m$ to one end of the upper end of the rock lever and a butterfly throttle valve $21^n$ pivotally mounted at $21^o$ in the manifold or gas conduit $21^p$ and rocked back and forth by the reciprocation of the link $21^i$ secured to an arm thereof. The proportions of these parts should be such that the speed of the engine will be maintained close to the desired speed. If the speed of the engine increases above the desired average, flyball governor $21^d$ will cause the throttle valve $21^n$ to choke the gas flow in the manifold $21^p$ to prevent the engine speed becoming excessively high. On the other hand, if, by reason of increased load or other causes, the engine is slowed down, the action of the governor $21^d$ will cause the throttle valve to open wider and thus prevent the engine speed from becoming excessively low.

In order to synchronize the rotatable threshing cylinder $22^a$ with respect to the engine $3^b$, a gear $22^b$ is secured to the extension of the crankshaft $3^c$ coaxially therewith, with which meshes a gear $22^c$ rotatable about an axis $22^d$ parallel to the shaft $3^c$, with which gear $22^c$ meshes a spur gear $22^e$ secured to a shaft $22^f$ having its axis parallel to the axis $22^d$ and having a beveled pinion $22^g$ mounted thereon and coaxial therewith which drives a bevel pinion $22^h$ secured to the shaft of the threshing cylinder $22^a$.

In order to keep the sickle $23^a$ reciprocating and in synchronism with the engine $3^b$, a connecting rod $23^b$ is pivotally secured to the journal $23^c$ extending from the spur gear $22^e$. The other end of this connecting rod $23^b$ is pivotally secured at $23^d$ between the arms of the yoke $23^e$ secured to the reciprocable sickle $23^a$.

In order to provide an overdrive from the ring gear $14^a$ to the drive wheels $24^a$, a planetary gear construction $24^b$ is provided. This planetary gear construction comprises a gear carrier $24^c$ secured to rotate with the drive shaft $24^d$ to which the ring gear $2^a$ is secured, the planet pinions $24^e$ mounted on the gear carrier $24^c$, the ring gear $24^f$ secured to the shaft $25^g$ which drives the drive wheels $24^a$, the sun gear $24^g$ rotatably mounted on the shaft $24^d$ and meshing with the planet gears $24^e$, and a clutch member $24^h$ rotatable with the shaft $24^d$ and capable of connecting the shaft $24^d$ either with the clutch element $24^j$ on the sun gear or with the fixed clutch element $24^k$.

*Operation of Fig. 9*

The combustion engine $3^b$ has a right-hand output shaft $3^c$ and a left-hand output shaft $3^c$. The left-hand output shaft $3^c$ supplies the power for driving the threshing cylinder $22^a$, the sickle $23^a$ and the speed controlling governor $21^d$ which controls the movement of the speed controlling carburetor valve $21^n$. The right-hand power output shaft $3^c$ has secured thereto the pump rotor $3^a$ which, in cooperation with the reaction rotors $6^a$ and $72$, supply power to rotate the turbine rotor $4^a$ which is secured to the drive shaft $5^a$. In proceeding from a standing start, as the pump rotor picks up in speed, both of the reaction members of the reaction rotors $6^a$ and $9^a$ will react to urge the turbine rotor to rotate in the same direction as the pump rotor. The reaction rotor $6^a$ will exert an additional force urging the turbine rotor to rotate in the same direction as the pump rotor if the clutch $15^a$ is in position to connect the shaft $5^a$ with the ring gear $14^a$ as the reaction rotor $6a$ will be caused by fluid pressure to rotate in a direction reverse to that of the pump rotor $1^a$. This will cause reverse rotation of the sun gear $8^a$. As the gear carrier $16^a$ is held against reverse rotation by the one-way clutch $17^a$, the reverse rotation of the sun gear $8^a$ will cause a forward rotation of the ring gear $14^a$ and of the shaft $24^a$ to which the ring gear $14^a$ is secured. As the engine and pump rotor pick up in speed, the reversible stator $6^a$ will slow down in its reverse movement due to the change in fluid pressure, come to a stop and then proceed to rotate in the same direction as the pump rotor. The speed of the reaction rotors $6^a$ and $9^a$ and of the turbine rotor $4^a$ will continue to pick up in speed until all three of them will eventually approximate the speed of the pump rotor $3^a$. Eventually therefore the shaft $24^d$ will be rotating at approximately the speed of the right-hand output shaft $3^c$ of the motor.

The gear transmission between the shaft $24^d$ and the shaft $25^g$ which drives the drive wheel $24^a$ can be set so that the shaft $23^g$ will be driven in the same direction at the same speed as the shaft $24^d$ or can be set so that the shaft $25^g$ will be driven at a slower speed than the shaft $24^d$. This variable speed transmission is set for direct forward drive by connecting the shaft $25^g$ to rotate in unison with the shaft $24^d$ which is connected to rotate in unison with the shaft $5^a$ by means of the clutch $15^a$ engaging the ring gear $14^a$. This is accomplished by throwing in the clutch $24^h$ which rotates with the shaft $24^d$ to connect it with the clutch plate $24^j$. This connects the sun gear $24^g$ to rotate with the shaft $24^d$. As the gear carrier $24^c$ is keyed to the shaft $24^d$, the planetary will rotate as a unit without relative rotation of the elements and give a one-to-one drive from the drive shaft $5^a$ through the drive shaft $24^d$ to the shaft $25^g$ which drives the drive wheel $24^a$.

In Fig. 10 the drive from the shaft $3d$ to the pump rotor $78$ and shaft $95$ comprises a pinion carrier $3^e$ secured to rotate with the shaft $3^d$, a pinion $3^f$ rotatably mounted on the pinion carrier $3^e$, a ring gear $3^g$ secured to rotate with the pump rotor $78$, and a sun gear $3^h$ meshing with the pinion $3^f$ and secured to rotate with the shaft $95$ and turbine rotor $79$.

If desired, the engine $3^b$ of Fig. 9 may have the right-hand end of its shaft $3^c$ connected to drive the left-hand end of the shaft $3^d$ which drives the automatically infinitesimally variable torque converter $78^a$ which drives the shaft 94 of Fig. 10 and the drive wheel 89.

The disclosure in Fig. 10 comprises a three rotor torque converter comprising a pump rotor 78, a turbine rotor 79 and a two-way rotatable reactor 80, a tubular shaft $80^a$ rotatable with the reactor 80, a planetary gear transmission comprising a sun gear 81 rotatable with the two-way rotatable reactor 80 and shaft $80^a$, a ring gear 82 connectible and disconnectible with respect to the turbine rotor 83 by means of a clutch 84, a pinion carrier 85 held against reverse rotation by the one-way anchorage member 86, a pinion 87 rotatably mounted on the pinion carrier 85 and meshing with the sun gear 81 and ring gear 82, brake means 88 for holding the pinion carrier 85 against rotation for reverse and for braking the coasting action, and an underdrive between the ring gear 82 and ground-engaging drive wheel 89 comprising a second ring gear 90 rotatable with the first ring gear 82, a second pinion 91 meshing with said second ring gear 90, a second pinion carrier 92 on which the second pinion 91 is mounted, a second sun gear 93 meshing with said second pinion 91, a shaft 94 coaxial with the shaft 95 to which the turbine rotor 79 is secured, said second sun gear 93 being rotatable relative to said shaft 94, said second gear carrier 92 being keyed to said shaft 94, and a two-way clutch 96 for alternatively connecting said sun gear 93 with the second gear carrier 92 and with a relatively fixed member 97.

*Operation of Fig. 10*

In Fig. 10, if the clutch 84 is connected with the ring gear 82, there are three power flow paths between the drive shaft $3^d$ and the ring gear. One of these paths is from the drive shaft $3^d$ through the pinion carrier $3^b$, pinion $3^f$, pump rotor 78, turbine rotor 79, shaft 95 and clutch 84 to the ring gear 82. A second power path is from the drive shaft $3^d$, pinion carrier $3^e$, pinion $3^f$, sun gear $3^h$, shaft 95 and clutch 84 to the ring gear 82. A third is from the drive shaft $3^d$, pinion carrier 3e, pinion $3^f$, ring gear $3^g$, pump rotor 78, rotatable reactor 80, shaft $80^a$, sun gear 81 and pinion 87 to the ring gear 82, the pinion carrier 85 being held against reverse rotation by the one-way anchorage member 86.

For reverse rotation, the clutch 84 is thrown out and the brake 88 is applied to hold the pinion carrier 85 against rotation. Under these conditions, the two-way rotatable reactor will be forced to rotate in reverse, driving the ring gear 82 in a direction of rotation opposite to that of the pump rotor 78.

There are two alternatively usable power paths from the ring gear 82 to the drive wheel 89. The drive wheel 89 is driven in synchronism with the shaft 94. The shaft 94 may, in one condition of the transmission, be driven at the same rotational speed as the ring gear and, in another condition of the transmission, at a speed different from that of the ring gear 82. For equal rotational speed, the two-way clutch is connected to rotate in unison with the pinion carrier 92, thus causing the planetary gearing 91 and 93 to rotate as a unit and therefore causing the ring gear 82 and shaft 94 to rotate as a unit.

In order to cause the shaft 94 to rotate at a lower rotational speed than the ring gear 82, the clutch 96 is connected with the fixed member 97, thus holding the sun gear 93 against rotation. This will cause the pinion carrier 92 to rotate at a lower speed than that of the ring gear 82 and will hence cause the shaft 94 to rotate at a lower speed than the gear 82.

Further modifications will be apparent to those skilled in the art and it is desired, therefore, that the invention be limited only by the scope of the appended claims.

Having thus described my invention, what I claim and desire to secure by Letters Patent is:

1. A hydraulic torque converter planetary gear transmission, said torque converter comprising a pump rotor, a turbine rotor, two guide reactance rotors, said planetary gear transmission comprising a rotatable planet gear carrier, planet gearing carried thereby, and two coaxial gears meshing with said planet gearing designed so that when the gear carrier is held against rotation and one of said gears is rotated in one direction, the other gear will be rotated in the opposite direction, means for connecting and disconnecting one of said gears for rotation with respect to said turbine rotor, means for connecting the other of said gears with one of said guide reactance rotors, one-way anchorage means preventing rotation of the other of said guide reactance rotors and said gear carrier in a direction reverse to that of the turbine rotor and enabling rotation of said other guide reactance rotor and gear carrier in the same direction as the turbine rotor, and means for holding said gear carrier against rotation in the same direction as said turbine rotor.

2. A hydraulic torque converter planetary gear transmission, said torque converter comprising a pump rotor, a turbine rotor, two guide reactance rotors, said planetary gear transmission comprising a rotatable planet gear carrier, planet gearing carried thereby, and two coaxial gears meshing with said planet gearing designed so that when the gear carrier is held against rotation and one of said gears is rotated in one direction, the other gear will be rotated in the opposite direction, means for connecting and disconnecting one of said gears for rotation with respect to said turbine rotor, means for connecting the other of said gears with one of said guide reactance rotors, one-way anchorage means preventing rotation of the other of said guide reactance rotors and said gear carrier in a direction reverse to that of turbine rotor and enabling rotation of said other guide reactance rotor and gear carrier in the same direction as the turbine rotor, means for holding said gear carrier against rotation in the same direction as said turbine rotor, manually controlled means for controlling said holding means and said connecting and disconnecting means for forward and reverse, pedal means for varying the power flow to said pump rotor, means controlled by the release of the pedal means for applying said holding means, means for connecting and disconnecting said turbine rotor with respect to said pump rotor, and speed controlled means controlled by the rotation of said other reactance rotor for controlling the last said connecting and disconnecting means.

3. A hydraulic torque converter planetary gear transmission, said torque converter comprising a pump rotor, a turbine rotor, a two-way rotatable, reversible reactance rotor, said planetary gear transmission comprising a rotatable planet gear carrier, planet gearing carried thereby, and two coaxial gears meshing with said planet gearing designed so that when the gear carrier is held against rotation and one of said gears is rotated in one direction, the other gear will be rotated in the opposite direction, means for connecting and disconnecting one of said gears for rotation with respect to the turbine rotor, means for connecting the other of said gears with said reactance rotor, one-way anchorage means preventing rotation of said gear carrier in a direction reverse to that of the turbine rotor and enabling rotation of said gear carrier in the same direction as the turbine rotor, and means for holding said gear carrier against rotation in the same direction as said turbine rotor when said one gear is disconnected for reverse.

References Cited in the file of this patent
UNITED STATES PATENTS

| | | |
|---|---|---|
| 2,005,444 | Weiss | June 18, 1935 |
| 2,293,358 | Pollard | Aug. 18, 1942 |
| 2,324,308 | Malmquist | July 13, 1943 |
| 2,549,125 | Paton | Apr. 17, 1951 |
| 2,578,450 | Pollard | Dec. 11, 1951 |
| 2,624,215 | McRae | Jan. 6, 1953 |
| 2,676,497 | Ahlen | Apr. 27, 1954 |